(No Model.)
G. W. HARRINGTON.
COMPOUND PIPE.
No. 562,359. Patented June 16, 1896.
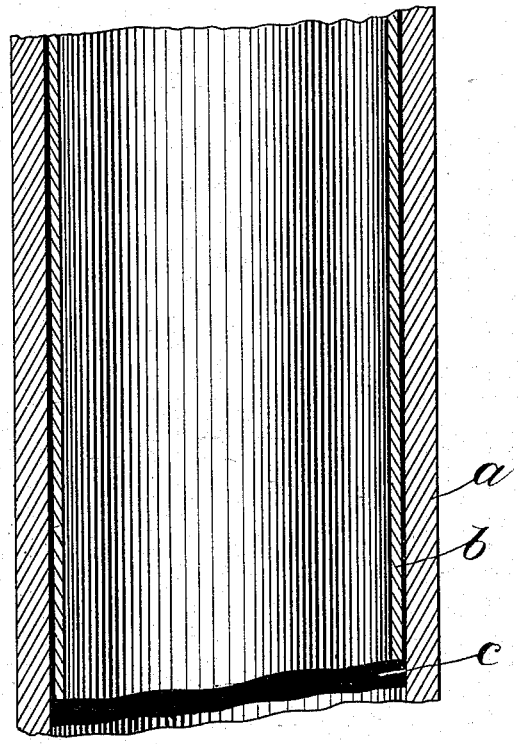
WITNESSES
Charles B Crocker
F. H. Davis
INVENTOR
George W. Harrington
by B. J. Noyes
atty.

UNITED STATES PATENT OFFICE.

GEORGE W. HARRINGTON, OF WAKEFIELD, MASSACHUSETTS, ASSIGNOR TO THE LEAD LINED IRON PIPE COMPANY, OF SAME PLACE.

COMPOUND PIPE.

SPECIFICATION forming part of Letters Patent No. 562,359, dated June 16, 1896.

Application filed June 14, 1895. Serial No. 552,780. (No model.)

*To all whom it may concern:*

Be it known that I, GEORGE W. HARRINGTON, of Wakefield, county of Middlesex, and State of Massachusetts, have invented an Improvement in Compound Pipes, of which the following description, in connection with the accompanying drawing, is a specification, like letters on the drawing representing like parts.

In certain pipes, as well as fittings and unions, connecting sections of the same together, an outer shell of iron or other material is provided interiorly with a lining of lead or other material which is unaffected by the material flowing through the pipe. This interior coating or lining has been expanded in the shell, the intention being that it will be held in place by being so expanded, but in practice it works loose, and more particularly when the pipe is subjected to certain changeable temperatures, as the ratio of expansion between the shell and its lining is quite large. One reason why the lead lining soon works loose is owing to the fact that when it contracts it does not resume its normal shape and position, as, for instance, it may expand longitudinally and afterward contract to a certain extent diametrically, thereby freeing itself from the outer pipe.

In practice compound pipes, pipe-fittings, &c., of this class, like other pipes, pipe-fittings, &c., are subjected to both high and low temperatures, as, for instance, while lying in a storehouse in the winter-time, and while being shipped from place to place they may frequently be kept for days at a temperature below freezing, then again they may lie in the sun and be thereby subjected to a much higher temperature, and in the summer-time they are continuously subjected to a considerably-higher temperature.

This invention has for its object to improve the construction of such lead-lined or interiorly-coated pipes, pipe-fittings, unions, &c.; and it consists in interposing between the lining and the outer pipe or shell a flexible adhesive substance, compound, or material, which has as a component part of it a substantially non-congealable fluid, such a compound acting to stick the pipes flexibly together, that is to say, the interposed substance by its adhesiveness sticks the pipes together, and by its flexibility permits expansion and contraction of the same at different ratios, such expansion and contraction being principally longitudinally, and the substantially non-congealable fluid gives to the compound its required fluidity, and materially lowers its congealing-point, carrying it far below freezing, the compound at all times retaining its flexibility and adhesiveness.

My substantially non-congealable flexible adhesive substance, compound, or material may be composed of rosin of which some of the volatile oils are eliminated by distillation or otherwise, thereby increasing its adhesiveness, and tar, such, for instance, as Wilmington tar of commerce, which is very fluid and which is substantially non-congealable, using, say, one part rosin and two parts tar; yet I do not limit my invention to these particular ingredients, or to any particular proportions. This material is very adhesive and flexible, and retains its adhesiveness and flexibility at very low temperatures, far below freezing.

The drawing shows a longitudinal section of pipe with my non-congealable flexible adhesive material interposed between the lining or outer pipe or shell.

*a* represents the outer pipe or shell, and *b* the lining, the former being made of iron and the latter of lead.

*c* represents a substantially non-congealable flexible adhesive material interposed between the shell and its lining. The adhesive compound or material may be interposed in any suitable way, the method of its introduction forming no part of my present invention. For instance, the lining may be placed within the shell and the adhesive compound or material, while hot, poured into one end between the parts, and thereafter the lining may be slightly expanded; or the compound or material may be poured or smeared onto the lining as it is introduced. As the adhesive material cools the parts will stick together sufficiently to prevent the lining from becoming detached from the outer pipe, and owing to the flexibility of the material the two pipes are permitted to expand and contract independently at their respective ratios, such expansion and contraction being principally longitudinally, and as the material is substantially non-congealable it retains its flexibility and adhesiveness at extremely low temperatures.

I am aware that bitumen has been interposed between an outer pipe and a glass core-pipe for the purpose of preventing the glass core-pipe from being broken by the contraction of the outer pipe, but such material congeals and becomes hard and brittle at, say, about 40° Fahrenheit, and when such a compound pipe is subjected to freezing temperature the material, being no longer either elastic or plastic, does not subserve the purpose for which it was intended; and if such material was interposed between an iron pipe and its lead lining, and the compound pipe thus produced subjected to freezing temperature or below, the lead lining would detach itself from the iron pipe, and when once loosened the pipe is worthless.

My invention is equally as well applicable to pipe-fittings and unions, and they are therefore included.

I do not herein claim a pipe, fitting, or union composed of a shell, a lining, and an interposed layer of flexible adhesive compound, as the same is not my invention.

I claim—

As a new article of manufacture a pipe, pipe-fitting or union composed of a shell $a$, lining $b$, and an interposed layer of flexible adhesive compound, having as a component part of it a substantially non-congealable fluid.

In testimony whereof I have signed my name to this specification in the presence of two subscribing witnesses.

GEORGE W. HARRINGTON.

Witnesses:
B. J. NOYES,
F. H. DAVIS.